United States Patent [19]
Kamali et al.

[11] Patent Number: 5,991,139
[45] Date of Patent: Nov. 23, 1999

[54] PROTECTION CIRCUIT AND A NODE FOR A COMMUNICATIONS SYSTEM USING THE PROTECTION CIRCUIT

[75] Inventors: Walid Kamali, Lawrenceville; Brian Green, Atlanta; Herman Kruse, Winder, all of Ga.

[73] Assignee: Scientific-Atlanta, Inc., Norcross, Ga.

[21] Appl. No.: 08/971,744

[22] Filed: Nov. 17, 1997

[51] Int. Cl.$^6$ ...................................................... H02H 1/00
[52] U.S. Cl. .............................................................. 361/119
[58] Field of Search ............................... 361/56, 91, 111, 361/119

[56] References Cited

U.S. PATENT DOCUMENTS

| | | | |
|---|---|---|---|
| 3,956,717 | 5/1976 | Fisher et al. | 333/121 |
| 4,247,953 | 1/1981 | Shinagawa et al. | 455/191.2 |
| 4,254,442 | 3/1981 | Dijkmans et al. | 361/56 |
| 5,390,337 | 2/1995 | Jelinek et al. | 455/5.1 |

*Primary Examiner*—Ronald W. Leja
*Attorney, Agent, or Firm*—Kenneth M. Massaroni; Kelly A. Gardner; Hubert J. Barnhardt, III

[57] ABSTRACT

A protection circuit prevents a surge applied to one end of a signal line from being applied to a circuit connected to another end of the signal line. The protection circuit includes a first diode having an anode coupled to the signal line and a first capacitor having a first electrode coupled to a cathode of the first diode and a second electrode coupled to a first potential. A second capacitor has a first electrode coupled to the signal line and a second diode has a cathode coupled to a second electrode of said second capacitor and an anode coupled to the first potential. A first inductor is coupled between the cathode of the first diode and the cathode of the second diode. A power supply terminal is applied with a power supply potential and is coupled to one end of the first inductor.

20 Claims, 1 Drawing Sheet

PROTECTION CIRCUIT AND A NODE FOR A COMMUNICATIONS SYSTEM USING THE PROTECTION CIRCUIT

BACKGROUND OF THE INVENTION

1. Technical Field

The present invention generally relates to a protection circuit for preventing voltage surges from being applied to a circuit and, more particularly, to such a protection circuit incorporated in a node (such as a line extender or a distribution amplifier) of a broadcast distribution system.

2. Description of Related Art

Broadband community area or cable television (CATV) systems have been designed with a system architecture known as "mink and feeder." The function of a trunk coaxial cable is to deliver broadband television signals from a reception center, or headend, over the shortest distance with the least amount of amplification to a plurality of distribution points. The distribution points are connected to feeder coaxial cables which emanate from the trunk coaxial cable and contain subscriber tap off devices. The broadband television signals are transmitted over the distribution network from the headend in a forward direction to a plurality of subscribers, which is generally termed a one-way system. However, more complex systems include a reverse signal path. The reverse channel is used for system control, messaging, pay-per-view events, monitoring, and the like.

As the signal travels down the feeder cable and through successive tap off devices, loss is incurred and the power level becomes progressively lower. If the last subscriber is reached before the signal level drops below the minimum tap port level set for the system, the feeder can be terminated and no additional devices are required. If, however, the signal level drops below the minimum required tap port level before the last subscriber (or subscribers) is reached, it is necessary to amplify the signal with a line extender amplifier before the feeder path can be continued. After amplification and equalization, the feeder is continued.

FIG. 1 is a general block diagram of a line extender which is usable in a television distribution system. Forward path communication signals (e.g., in a frequency range of 50–860 Megahertz) from a coaxial cable are supplied via a capacitor 101 to a diplex filter 103. Diplex filter 103 provides these forward path communication signals to a series of amplifiers 105, 107, 109, and 111. Amplifiers 105, 107, 109, and 111 may, for example, be Gallium Arsenide (GaAs) Field Effect Transistor (FET) amplifier circuits. Equalization circuits 113 and 115 are provided to equalize the forward path communication signals. In one implementation, equalization circuit 113 may be a plug-in circuit so that different circuits may be easily incorporated into the line extender depending on the signal characteristics at the particular location of the line extender. The output of amplifier 111 is supplied to a diplex filter 117 and output to the distribution network via a capacitor 118. Reverse path communication signals (e.g., in a frequency range of 4–160 Megahertz) are supplied to diplex filter 117 via capacitor 118. These signals are then provided to reverse path amplifier 119. The output of reverse path amplifier 119 is supplied to the distribution system via diplex filter 103 and capacitor 101. AC power (60 Volts, 60 Hertz) or higher, passes through a path including inductors 121 and 123. Jumper Connectors 125 and 127 are provided to direct power flow through the amplifier housing as required by the system's architecture.

Three types of signals (i.e., forward path communications signals, reverse path communication signals, and AC power) are present in line extenders such as the line extender of FIG. 1, as well as in other amplifiers in the television distribution network. Voltage surges associated with any of these signals can cause damage to the active components of the line extenders and other amplifiers, especially during installation procedures or during "hot coring." (Hot coring is the procedure of striping out the outer conductor of a coaxial line using a conductive blade, while AC power is present.) In particular, damage of amplifiers 109 and 111 shown in FIG. 1 has been observed when a coaxial cable of the distribution system is connected to the output terminal for the forward path amplifiers of line extenders. This damage is caused by high frequency surges generated by the arcing which occurs as the connection or disconnection is made. While various surge protection circuits are known, these circuits generally utilize one or more capacitors in the signal path, thereby resulting in a DC disconnection in the signal path. Such a DC disconnection can in some cases disrupt the biasing of the amplifiers. In order to provide protection against surges of both positive and negative polarities, surge protection circuits generally require the use of two power supplies (e.g., a positive and a negative power supply). The need for two power supplies increases the costs associated with the line extenders. Protection circuits which do not require biasing operate either at low level (system inputs) or at considerably high levels which are beyond the damage threshold of the GaAs FETs. Such circuits are also generally slow in responding to such surges.

Accordingly, it would be desirable to provide a protection circuit which overcomes these and other disadvantages of prior systems.

SUMMARY OF THE INVENTION

In accordance with a first aspect of the present invention, a protection circuit prevents a surge applied to one end of a signal line from being applied to a circuit connected to another end of the signal line. The protection circuit includes a first diode having an anode coupled to the signal line and a first capacitor having a first electrode coupled to a cathode of the first diode and a second electrode coupled to a first potential. A second capacitor has a first electrode coupled to the signal line and a second diode has a cathode coupled to a second electrode of said second capacitor and an anode coupled to the first potential. A first inductor is coupled between the cathode of the first diode and the cathode of the second diode. A power supply terminal is applied with a power supply potential and is coupled to one end of the first inductor.

In accordance with another aspect of the present invention, a node for a signal distribution system includes an amplifier and a protection circuit for preventing a surge on a signal line coupled to an output of the amplifier from being applied to the amplifier. The protection circuit includes a first diode having an anode coupled to the signal line and a first capacitor having a first electrode coupled to a cathode of the first diode and a second electrode coupled to a first potential. A second capacitor has a first electrode coupled to the signal line and a second diode has a cathode coupled to a second electrode of the second capacitor and an anode coupled to the first potential. A first inductor is coupled between the cathode of the first diode and the cathode of the second diode. A power supply terminal is coupled to one end of the first inductor and a power supply voltage is applied thereto.

The protection circuit in accordance with the present invention does not require a DC disconnection in the RF signal path. In addition, only a single power supply is required, thereby reducing costs and power requirements.

These and other features and aspects of the invention will be more clearly understood and better described if the following detailed description is read in conjunction with the appended drawings.

DETAILED DESCRIPTION

Figure 2:
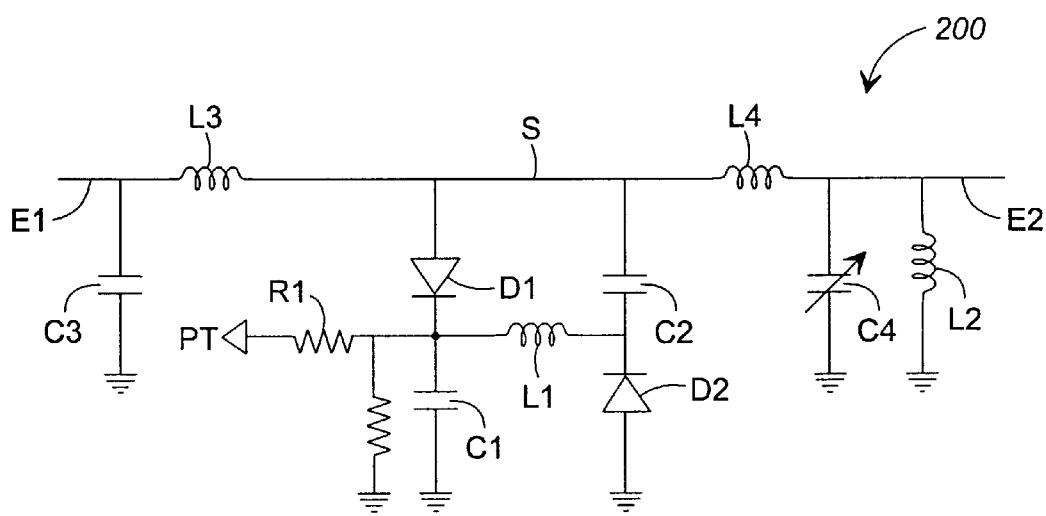
FIG. 2 is circuit diagram of a protection circuit in accordance with the present invention.

FIG. 2 is a schematic diagram of a non-linear protection circuit 200 in accordance with the present invention. Protection circuit 200 is connected across (i.e., in parallel with) a signal line S and prevents voltage surges, spikes, etc. which occur at an end E2 of signal line S from being applied to a circuit connected to an end E1 of signal line S. In one implementation, signal line S is an RF signal line for broadband communications and the circuit connected to end E1 is a 12-volt gallium arsenide (GaAs) field effect transistor (FET) amplifier circuit of a node (e.g., a line extender or a distribution amplifier) of a television distribution system. An example of such a GaAs FET amplifier is a GaAs MESFET Integrated Circuit (Part No. ADA0860) available from Anadigics which includes a pair of identical amplifier stages using two cascaded transistors each. Of course, the invention is not limited to any particular signal line nor any particular circuit connected thereto. Other applications (e.g., antenna connections, V.S.W.R. restriction, and the protection of GaAs or Si devices from electrostatic discharges, and from exceeding their voltage breakdown) for the protection circuit of the present invention will be apparent to those in the art. In addition, while the protection circuit shown in FIG. 2 is arranged at the output side of a circuit, it will be apparent that the protection circuit may also be arranged at the input side of a circuit or even as an interstage circuit to prevent the amplifier stages from damaging each other.

Protection circuit 200 provides protection for positive and negative surges on signal line S via first and second paths. The first path includes a diode D1 and a capacitor C1 and serves to prevent positive surges from being applied to the circuit. The second path includes a capacitor C2 and a diode D2 and prevents negative surges from being applied to the circuit. Specifically, for positive surges, the protection circuit operates when $V_{RF} \geq V_{DC}+V_{BR}$, where $V_{RF}$ is the signal line voltage; $V_{DC}$ is the voltage applied to the cathode of diode D1; and $V_{BR}$ is the barrier voltage of the diodes. Similarly, for negative surges, this relation becomes: $-V_{DC}-V_{BR} \geq V_{RF}$. In general, the surge protection circuit operates when $|V_{RF}| \geq V_{DC}+V_{BR}$ As noted above, protection circuit 200 includes first and second diodes D1 and D2 and first and second capacitors C1 and C2. In one implementation, diodes D1 and D2 are PIN diodes. The anode of first diode D1 is coupled to signal line S. A first electrode of capacitor C1 is coupled to the cathode of first diode D1 and the second electrode of capacitor C1 is coupled to a first potential. In one implementation, the first potential is ground. A first electrode of second capacitor C2 is coupled to signal line S. The cathode of diode D2 is coupled to the second electrode of capacitor C2 and the anode of diode D2 is coupled to the first potential. A first inductor L1 is coupled between the cathode of first diode D1 and the cathode of second diode D2. A power supply terminal PT to which a power supply voltage is applied is coupled to one end of the first inductor L1. In the implementation shown in FIG. 2, a voltage divider including resistors R1 and R2 is coupled between power supply terminal PT and the one end of first inductor L1. In this way, a voltage lower than the power supply voltage is applied to the one end of first inductor L1. For example, in the case where signal line S is an RF signal line for broadband communications, the circuit connected to end E1 is a 12-volt GaAs FET amplifier circuit, and the power supply is 12 volts, the resistances of R1 and R2 may be chosen so that a voltage of about 10 volts is applied to the one end of inductor L1. A second inductor L2 has a first end coupled to signal line S and a second end coupled to the first potential. Second inductor L2 provides a DC return for the voltage applied to the power supply terminal.

When the RF voltage exceeds the level $V_DC+V_{BR}$ the PIN diode D1 starts conducting and its impedance goes down, thereby lowering the voltage level. The same phenomenon occurs with respect to PIN diode D2 when a negative surge occurs. The only difference for the negative surge is that capacitor C2 ensures a level shifting for the PIN diode D2, which is actually operating at 0 Volts.

In some implementations, other inductors and capacitors may be utilized in order to improve the impedance match if needed. For example, in the case where signal line S is an RF signal line for broadband communications and the circuit connected to end E1 is a 12-volt GaAs FET amplifier circuit of a node of a television distribution system, third and fourth lumped inductors L3 and L4 and third and fourth lumped capacitors C3 and C4 may be utilized. Inductors L3 and L4 are connected in the signal line. However, even though these inductors are connected in the signal path, the DC continuity through the protection circuit 200 is maintained. If the protection circuit is designed in a form of a plug-in board, it may become necessary to introduce the capacitors C3 and C4 to compensate for the parasitic inductors caused by the added length. This will help to maintain a good match. The third and fourth capacitors C3 and C4 each has a first electrode coupled to the signal line and a second electrode coupled to the first potential. In one implementation, fourth capacitor C4 is a variable capacitor to permit "tuning" of the protection circuit. If amplifier band is not extremely wide, the presence of the added lumped components is not essential. Their role is simply to maintain a good impedance match. Some implementations could use the transmission line and equally spaced capacitors to achieve a good impedance match.

Examples of component type and component values are:

C1, C2: 0.01 microfarads

C3, C4: 1 picofarad

L1: 680 nanohenries

L2: 320 nanohenries

L3, L4: 5 nanohenries

D1 and D2: Model HSMP3820 [available from HP] or equivalent

Potential at PT: 12 Volts

Potential applied to cathode of diode D1 using voltage divider: 10 Volts

A protection circuit configured as shown in FIG. 2 and using components with the values identified above is effective to protect against surges in a frequency range from about 40 megahertz to about 860 megahertz. Of course, these component types and component values are identified for purposes of illustration, not limitation. It will be apparent that component types and component values may be chosen in accordance with desired implementations and frequency ranges.

Figure 1:
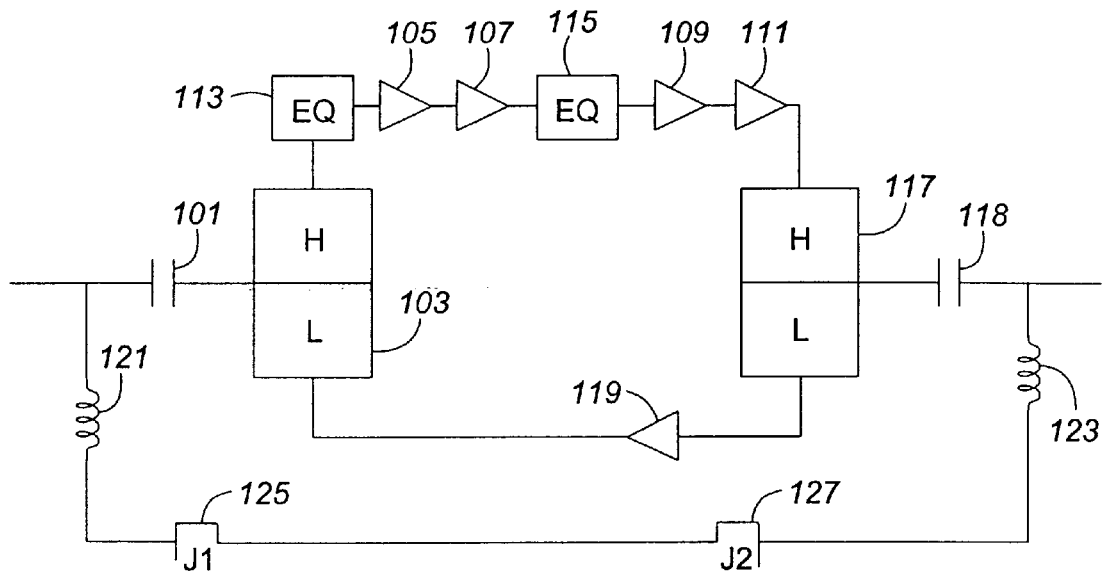
FIG. 1 is a block schematic diagram of a line extender.

In one particular implementation, the components of the line extender shown in FIG. 1, instead of being assembled on the same board along with the amplifier, they are provided on a first circuit board and the components of the protection circuit shown in FIG. 2 are provided on a second circuit board which is removably attachable to the first circuit board. In this way, assuming the first circuit board includes a suitable connector, line extenders and other amplifiers already in the field can be modified to include the protection circuit of this invention.

The above-described protection circuit provides DC continuity in the RF signal path. In addition, only a single power supply is required, thereby reducing costs and power requirements. In addition, the protection circuit is symmetrical. This is important since certain signals (such as television signals) which are processed by asymmetrical circuits tend to develop distortions. In the case of television signals, such distortions can diminish picture quality.

While there has been shown and described the preferred embodiments of the invention, it will be evident to those skilled in the art that various modifications may be made thereto without departing from the spirit and scope of the invention as set forth in the appended claims.

We claim:

1. A protection circuit for preventing a surge applied to one end of a signal line from being applied to a circuit connected to another end of said signal line, comprising:
    a first diode having an anode coupled to said signal line;
    a first capacitor having a first electrode coupled to a cathode of said first diode and a second electrode coupled to a first potential;
    a second capacitor having a first electrode coupled to said signal line;
    a second diode having a cathode coupled to a second electrode of said second capacitor and an anode coupled to the first potential;
    a first inductor coupled with its first end to said cathode of said first diode, and with its second end to said cathode of said second diode; and
    a power supply terminal applied with a power supply potential and which is coupled to the first end of said first inductor.

2. The protection circuit according to claim 1, further comprising:
    a voltage divider coupled between said power supply terminal and said first end of said first inductor.

3. The protection circuit according to claim 1, wherein said first and second diodes comprise PIN diodes.

4. The protection circuit according to claim 1, wherein said protection circuit is operable in a frequency range from about 40 megahertz to about 860 megahertz.

5. The protection circuit according to claim 1, further comprising:
    a second inductor having a first end connected to said signal line and a second end connected to the first potential.

6. The protection circuit according to claim 1, further comprising:
    a third capacitor having a first electrode coupled to said signal line and a second electrode coupled to the first potential;
    a fourth capacitor having a first electrode coupled to said signal line and a second electrode coupled to the first potential;
    a third inductor coupled in said signal line; and
    a fourth inductor coupled in said signal line.

7. The protection circuit according to claim 6, wherein said fourth capacitor comprises a variable capacitor.

8. The protection circuit according to claim 1, wherein the first potential is ground.

9. A node for a signal distribution system, comprising:
    an amplifier; and
    a protection circuit for preventing a surge on a signal line coupled to an output of said amplifier from being applied to said amplifier, said protection circuit comprising:
        a first diode having an anode coupled to said signal line;
        a first capacitor having a first electrode coupled to a cathode of said first diode and a second electrode coupled to a first potential;
        a second capacitor having a first electrode coupled to said signal line;
        a second diode having a cathode coupled to a second electrode of said second capacitor and an anode coupled to the first potential;
        a first inductor coupled between said cathode of said first diode and said cathode of said second diode; and
        a power supply terminal coupled to one end of said first inductor and to which a power supply voltage is applied.

10. The node according to claim 9, further comprising:
    a voltage divider coupled between said power supply terminal and said one end of said first inductor.

11. The node according to claim 9, wherein said amplifier comprises a forward path amplifier.

12. The node according to claim 9, further comprising:
    a reverse path amplifier.

13. The node according to claim 9, wherein said amplifier is a gallium arsenide (GaAs) field effect transistor (FET) amplifier.

14. The node according to claim 9, wherein said first and second diodes comprise PIN diodes.

15. The node according to claim 9, wherein said protection circuit is operable in a frequency range from about 40 megahertz to about 860 megahertz.

16. The node according to claim 9, wherein said node comprises a line extender.

17. The node according to claim 9, further comprising:
    a second inductor having a first end coupled to said signal line and a second end coupled to the first potential.

18. The node according to claim 9, further comprising:
    a third capacitor having a first electrode coupled to said signal line and a second electrode coupled to the first potential;
    a fourth capacitor having a first electrode coupled to said signal line and a second electrode coupled to the first potential;
    a third inductor coupled in said signal line; and
    a fourth inductor coupled in said signal line.

19. The node according to claim 18, wherein said fourth capacitor comprises a variable capacitor.

20. The node according to claim 9, wherein said signal distribution system is a cable television distribution system.

* * * * *